Feb. 28, 1933. I. L. EASTMAN 1,899,798
GREASE GUN HEAD AND RESERVOIR CONSTRUCTION
Filed Oct. 17, 1932 3 Sheets-Sheet 1
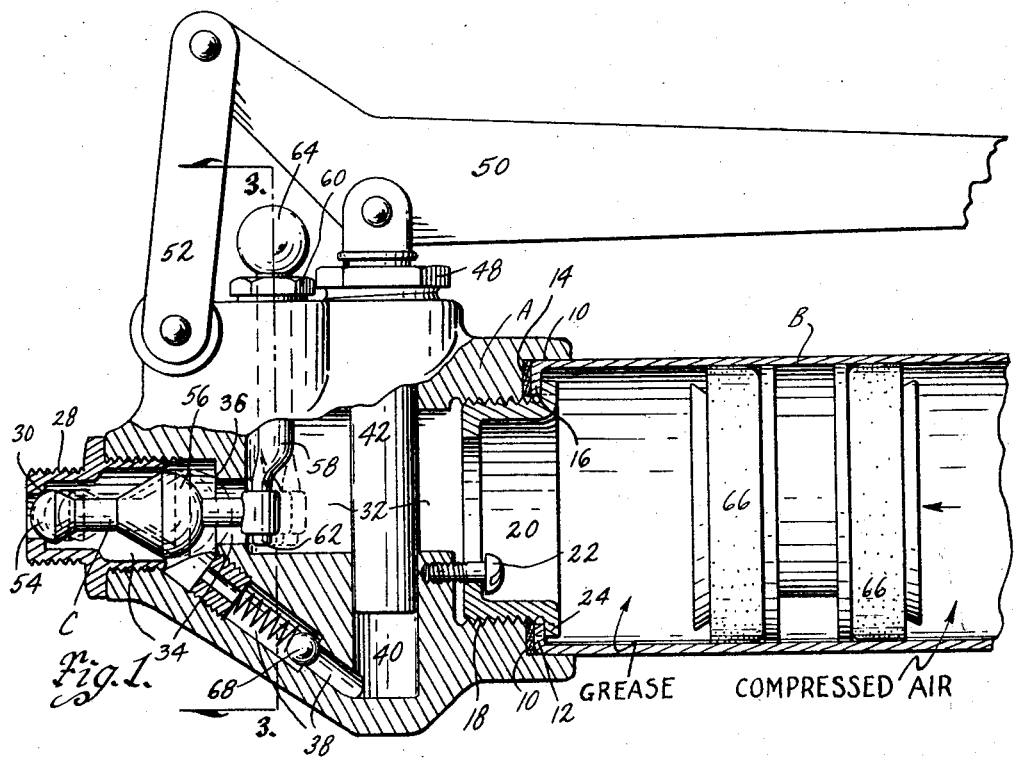
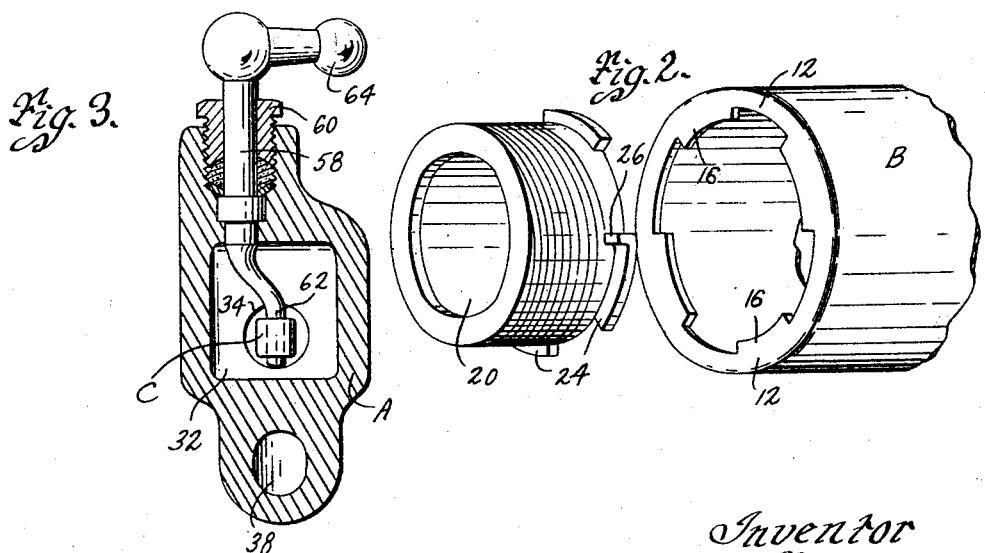
Inventor
Ivan L. Eastman
by Bair, Freeman & Sinclair
Attorneys Feb. 28, 1933.    I. L. EASTMAN    1,899,798
GREASE GUN HEAD AND RESERVOIR CONSTRUCTION
Filed Oct. 17, 1932    3 Sheets-Sheet 2
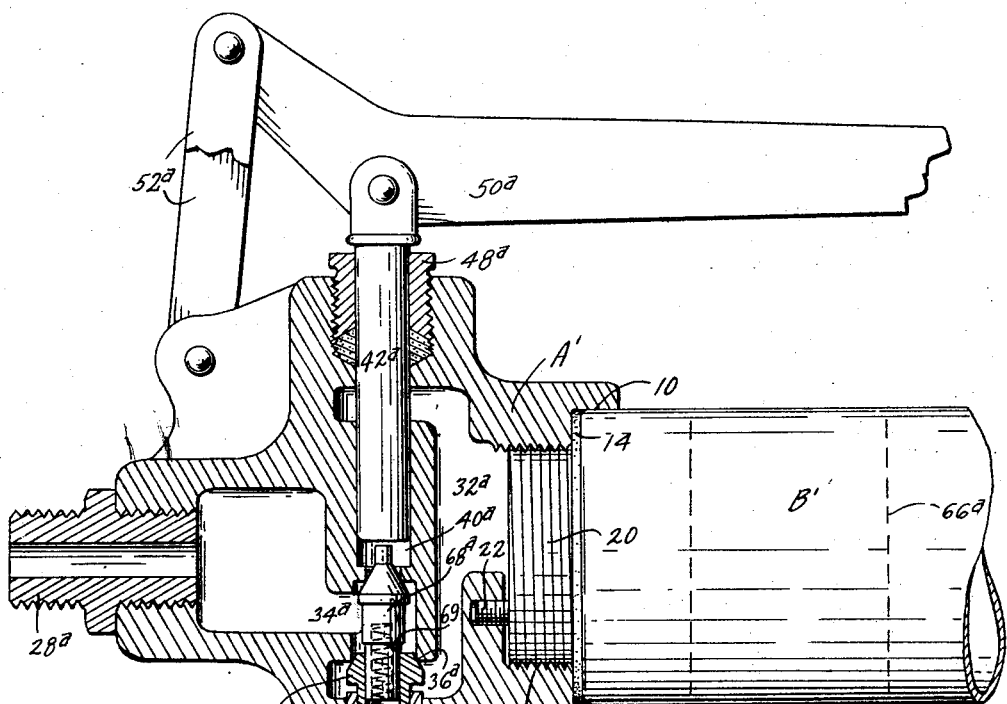
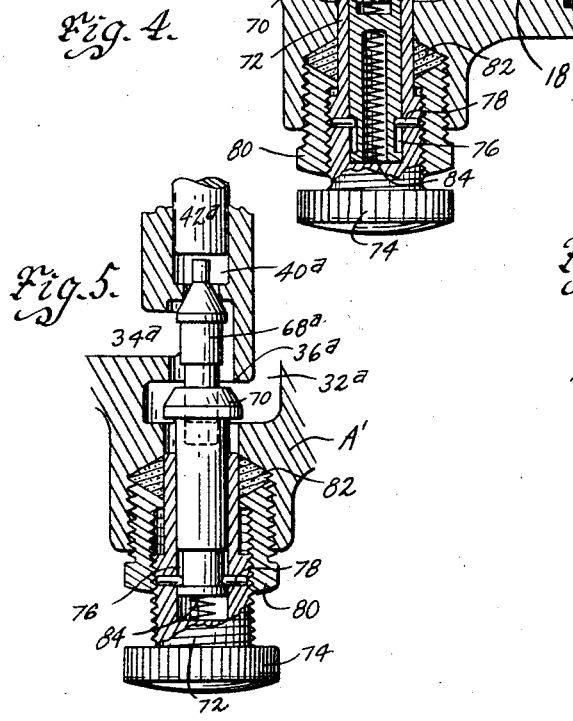
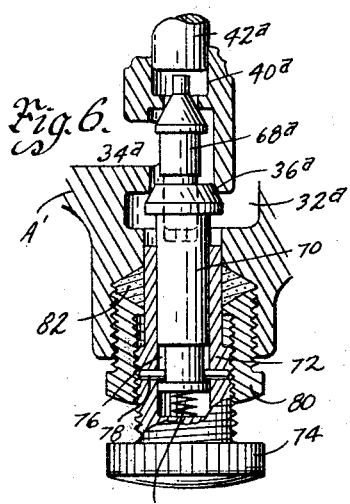
Inventor
Ivan L. Eastman
by Bair, Freeman & Sinclair
Attorneys Feb. 28, 1933.  I. L. EASTMAN  1,899,798
GREASE GUN HEAD AND RESERVOIR CONSTRUCTION
Filed Oct. 17, 1932   3 Sheets-Sheet 3
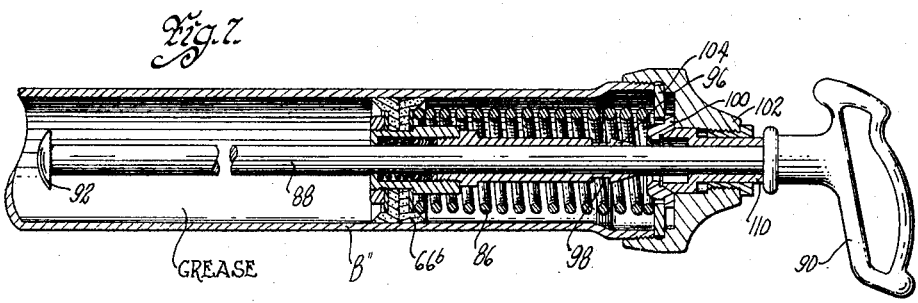
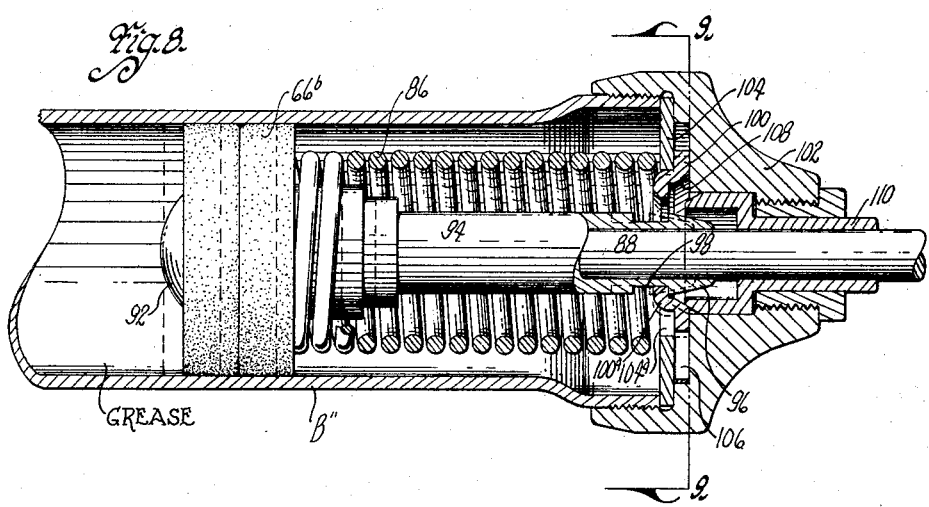
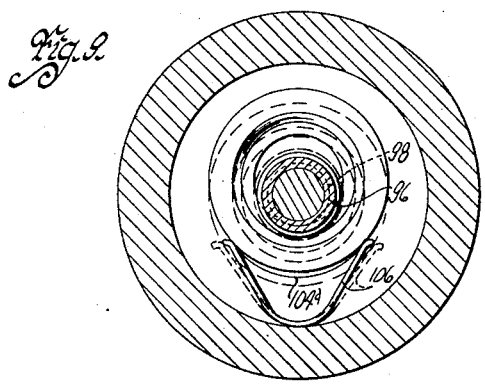
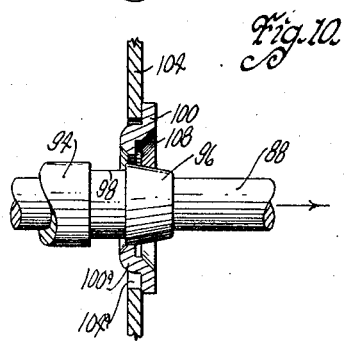

Patented Feb. 28, 1933

1,899,798

UNITED STATES PATENT OFFICE

IVAN L. EASTMAN, OF BRYAN, OHIO, ASSIGNOR TO THE ARO EQUIPMENT CORPORATION, OF BRYAN, OHIO, A CORPORATION OF OHIO

GREASE GUN HEAD AND RESERVOIR CONSTRUCTION

Application filed October 17, 1932. Serial No. 638,105.

The object of my invention is to provide a grease gun head and reservoir construction which is simple, durable and comparatively inexpensive to manufacture.

Another object of my invention is to provide a grease gun head construction for co-action with a reservoir, the parts being arranged for quick connection and disconnection of the reservoir relative to the grease gun head.

Still a further object is to provide a quickly disengageable connection between a grease reservoir and a grease gun head, yet one which involves screw threads so that it can be rotated for compressing a gasket interposed between the grease gun head and the reservoir, for thus sealing one relative to the other against leakage of grease under pressure.

Still a further object is to provide a connecting member threaded in the grease gun head and having a lug connection with the reservoir whereby it may be rotated by rotating the reservoir and also the reservoir may be rotated relative to it for quickly disconnecting the lugs of the connecting member and reservoir from each other.

Still another object is to provide a grease gun head construction for use with a grease reservoir having grease under pressure therein, the head construction including a booster pump and a manually operable valve means being provided in the head for selective movement to a discharge nozzle closing position, a low pressure discharge position or a high pressure discharge position.

Still a further object is to provide a modified form of the head construction in which a manual control operates a closure valve so that the head can be used in connection with various types of grease discharge equipment.

Still a further object is to provide a reservoir construction in which a novelly releasable latch is included for holding a spring urged reservoir piston in retracted position while filling the reservoir.

Still a further object is to provide a latch for holding a spring urged piston in retracted position, the means for retracting the piston being operable to release the latch.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a partially sectioned side elevation of a grease gun head construction embodying my invention, showing a portion of a grease reservoir connected therewith.

Figure 2 is a separated perspective view of the grease reservoir and a sleeve for connecting it with the grease gun head.

Figure 3 is a sectional view on the line 3—3 of Figure 1 showing a valve control mechanism.

Figure 4 is a sectional view similar to Figure 1 showing a modified form of construction.

Figures 5 and 6 are views of the lower portion of Figure 4 showing the parts in different operative positions.

Figure 7 is a sectional view through a reservoir construction which can be used in place of the reservoir shown in Figures 1 and 4, the figure being drawn on a reduced scale.

Figure 8 is an enlarged sectional view of the reservoir in Figure 7 showing the parts in a different position.

Figure 9 is a sectional view on the line 9—9 of Figure 8; and

Figure 10 is a view of parts in Figure 8 shown in still another position.

On the accompanying drawings I have used the reference character A to indicate generally a grease gun head and B a reservoir. Ordinarily grease gun heads and reservoirs are connected together by a screw threaded connection. When it is desired to refill the reservoir by removing it from the head, it is a job involving a considerable amount of time to unscrew the reservoir and screw it back in place after it has been refilled. I have provided a connection, which will now be described, which may be quickly operated and yet has the desired screw threaded feature for compressing the gasket for sealing purposes.

The grease gun head A has a socket 10 adapted to receive the forward end of the reservoir or barrel B. The barrel B has an in-turned flange 12 adapted to contact with a gasket 14 which is interposed between the flange and the bottom of the socket 10. As shown in Figure 2 the flange 12 has a plurality of annularly spaced extensions or lugs 16.

The grease gun head A has a threaded sub-socket 18. A connecting member 20 of sleeve like formation is threaded into the sub-socket 18. It is limited in its rotation in an unscrewing direction by a cap screw 22.

The connecting member 20 is provided with a plurality of annularly spaced lugs 24. One of the lugs 24 has a stop means 26 thereon which can be in the form of a lug bent out of the plane of the lugs 24. The lugs 24 are adapted to enter between the lugs 16 of the barrel B when the lugs 24 do not register with the lugs 16. The parts, of course, are formed to the proper dimensions to permit all this.

In operation, the barrel B, when disconnected from the head A can be rotated to the proper position where the lugs 24 do not register with the lugs 16 and can then be pushed into the socket 10 against the gasket 14. Thereafter the barrel B can be rotated until one of the lugs 16 thereof strikes the stop means 26 and further rotation of the barrel will then rotate the connecting member 20.

During such rotation the lugs 16 are under the lugs 24 whereby they are pulled toward the grease gun head and pull with them the flange 12 for tightening it against the gasket 14 and thus sealing the space between the barrel and the grease gun head. The space can be as tightly sealed as desired by rotating the member 20 the proper number of turns.

Thus the parts A and B are quickly connected and, with a little rotation, sealed relative to each other. When it is desired to quickly disconnect them, the barrel B is rotated in a direction for loosening the member 20 and will partially loosen it and partially rotate relative to the gasket 14, and part of the time, relative to the member 20 also. Another lug 16 then engages the lug 26 so that the member 20 can be rotated until its rotation is stopped by the cap screw 22 whereupon the barrel B may be lifted out of the socket 10 and the member 20 will be in position for receiving it again after it is refilled. The cap screw 22 is adjusted to such a position that minimum rotation of the member 20 is required.

The grease gun head A has a discharge nozzle 28 provided with a valve seat 30. Between the nozzle 28 and an intake opening 32, which receives grease from the reservoir B, is a passageway 34. A valve seat 36 is provided in the passageway. Communicating with the space between the valve seats 30 and 36 is a passageway 38 leading from a booster pump cylinder 40. A booster pump plunger 42 is reciprocable relative to the cylinder 40.

The plunger 42 extends through a packing nut 48 and an operating lever 50 is pivoted to the outer end of the plunger. The lever 50 has a link connection at 52 with the grease gun head A.

Within the passageway 34 is a valve member C having valve heads 54 and 56 adapted for seating on the valve seats 30 and 36 respectively. The valve member C is manually operable, a valve stem 58 being provided for operating it. The valve stem 58 extends through a packing nut 60 and has a crank pin 62 pivotally associated with a hub 64 of the valve member C. Outside of the packing nut 60 an operating lever 64 is provided on the valve stem 58.

Within the reservoir B, I provide a piston 66 for forcing grease ahead of it into the intake 32 of the grease gun head. As indicated on Figure 1 of the drawings, compressed air may be utilized for the purpose of placing the contents of the reservoir B under pressure, although other devices, such as a spring 86 or the like, as shown in Figures 7 and 8, can be used for this purpose.

The valve member C is operable in three positions. In its full line position, it prevents the grease under pressure from the intake 32 from being forced through the passageway 34 and out of the discharge nozzle 28. The grease, being under pressure, tends to keep the valve in this position.

When the valve is moved to the central position, shown by dotted lines in Figure 1, grease can be dispensed under low pressure from the nozzle 28 by reason of the compressed air forcing the piston 66 toward the left.

In the dash line position, the booster pump, comprised of the plunger 42, the cylinder 40 and a check valve 68, can be operated to force grease from the nozzle 28 at high pressure without allowing it to be forced back through the passageway 34 into the intake 32 because of the valve head 56. The high pressure of the grease, when the booster pump is used, tends to keep the valve head 56 seated against the seat 36.

In Figures 4, 5 and 6, I have shown a modified form of control for the grease gun head. Parts in these figures corresponding to the parts in Figures 1, 2 and 3 are indicated by the same reference numerals with the addition of the distinguishing characteristic "a". The grease gun head itself is indicated as A' and the reservoir as B'.

It will be noted that the check valve 68a is in a different position than the check valve 68 in Figure 1. In Figure 4, it is arranged so that it can be engaged and opened by the plunger 42. The passageway 34a is provided with a valve seat 36a with which a valve member 70 is adapted to coact. The valve member 70 extends into a sleeve 72 having a control knob 74 thereon.

The valve member 70 has an annular groove 76 into which pins 78 of the sleeve member 72 extend.

The sleeve member 72 is adjustable by being threaded in a packing nut 80. The packing nut 80 is for packing 82 which packs the sleeve 72 relative to the grease gun head A'. A spring 84 is interposed between the sleeve member 72 and the valve member 70 to normally constrain the valve member toward closed position with respect to the valve seat 36a.

This type of construction is especially adapted for different types of greasing equipment connected with the discharge nozzle 28a. With the valve member 70 in the position of Figure 4, it is positively closed by the knob 74 being screwed in as far as it will go, thus causing the pins 78 to engage the top of the annular groove 76 and force the valve 70 against the seat 36a. In this position, a whip end hose or the like can be connected with the discharge nozzle 28a and the plunger 42a reciprocated to force the grease under high pressure from the intake 32a through the check valve 68a and into the nozzle 28a.

As shown in Figure 5 the valve 70 can be held open by screwing the knob 74 to its outer position so that the pins 78 engage the bottom of the annular groove 76 for positively holding the valve member 70 away from the valve seat 36a. This adjustment is adaptable for using a push booster fitting connected with the nozzle 28a. The grease will then be supplied from the intake 32a up through the valve seat 36a into the passageway 34a and then into the discharge nozzle and the push booster fitting wherein its pressure is increased by operation of the push booster.

As shown in Figure 6, the valve 70 can be spring closed by the spring 84 with the pins 78 in an intermediate position between the positions shown in Figures 4 and 5. When in this position, a direct delivery nozzle can be applied to the nozzle 28a and grease under pressure of the compressed air behind the piston 66a will be forced at the pressure of the compressed air through the valve seat 36a when the handle 50a is used as a controlling device to cause the plunger 42a to open the valve 70 against the action of the spring 84. The check valve 68a has a shoulder 69 to engage the upper end of the valve 70 for this purpose so that the check valve merely acts as an intermediate thrust member between the plunger 42a and the valve 70. Thus the flow of grease to the direct delivery nozzle can be regulated by the handle 50a which is ordinarily used for operating the booster pump plunger 42a.

Although I have thus far in my specification referred to compressed air operated pistons 66 and 68a, the piston can be spring operated. In Figures 7 and 8, I show a piston 66b urged to move in a grease expelling direction by the spring 86.

The piston 66b can be retracted in a number of ways. I have shown a retracting rod 88 for this purpose terminating in a handle 90. The rod 88 is slidable through the piston 66b and has a head 92 to engage the piston during the retracting operation.

It is desirable to latch the piston 66b in retracted position. For this purpose, I provide a sleeve 94 operatively connected with the piston and having a tapered nose 96 and a latch groove 98. A latch washer 100 is adapted to coact with the latch groove 98. The latch washer is retained between a cylinder head 102 and a washer 104.

The latch washer 100 has a hub 100a smaller in external diameter than a bore 104a of the washer 104. A leaf spring 106 tends to constrain the latch washer 100 to an eccentric position relative to the washer 104 as shown in Figures 8 and 9.

The latch washer 110 has a tapered bore 108 with which a sleeve 100 is adapted to coact. As shown in Figure 7, the handle 90 may be pressed in for causing such coaction whereupon the latch washer 100 will move to a concentric position relative to the washer 104 and release the piston 66b so that the spring 86 can expand to exert pressure on the grease in the reservoir B.

When compressing the spring 86, the tapered nose 96 will engage the bore of the washer 100 as shown in Figure 10 and move it against the action of the spring 106 until it can snap into the groove 98. Thus the piston is automatically locked in its retracted position when the handle 90 is pulled outwardly and may be unlocked by pressing the handle 90 against the sleeve 110.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. In a grease gun head construction, a grease gun head having a threaded portion, a grease reservoir adapted to be connected with said head and means for sealing said reservoir relative to said head comprising a connecting member threadedly engaged with the threaded portion of said head, said reservoir and said connecting member having projections to coact with each other for rotating said connecting member when said reservoir is rotated and for drawing said reservoir into sealing relationship to said head.

2. In a grease gun head construction, a grease gun head having a threaded portion, a gasket, a grease reservoir abutting said head with said gasket interposed between said reservoir and said head and means for sealing said reservoir relative to said head comprising a connecting member threadedly engaged with the threaded portion of said head, said reservoir and said connecting member having projections to coact with each other for drawing said reservoir toward said head to compress said gasket therebetween when said reservoir is rotated.

3. In a grease gun head construction, a grease gun head having a socket therein, a grease reservoir having an inturned flange for contact with the bottom of said socket, said grease gun head having a threaded sub-socket, a threaded sleeve therein having lugs to project toward the flange of said reservoir, lugs extending from said flange for coaction with the lugs of said threaded sleeve, all of said lugs being annularly spaced whereby they may be rotated to registered or non-registered position and projecting means for causing rotation of said threaded sleeve by rotating said reservoir.

4. In a grease gun head construction, a grease gun head having an intake opening for grease from a reservoir, a discharge nozzle, a passageway between said nozzle and said intake opening, a valve seat in said nozzle, a second valve seat in said passageway, a valve member in said passageway between said seats and adapted to be selectively seated against either of them and a booster pump between said intake opening and said passageway.

5. For use with a reservoir having grease under pressure therein, a grease gun head construction comprising a grease gun head connected with said reservoir and having a discharge nozzle, a passageway between said nozzle and said reservoir, a valve seat in said discharge nozzle, a second valve seat in said passageway, a valve member in said passageway adapted to be selectively seated against either of said seats or positioned spaced from each of said seats and a booster pump between said reservoir and the portion of said passageway between said seats.

6. For use with a reservoir having grease under pressure therein, a grease gun head construction comprising a grease gun head connected with said reservoir and having a discharge nozzle, a passageway between said discharge nozzle and said reservoir, a booster pump between said reservoir and said passageway and valve means in said passageway selectively operable to close said discharge nozzle and open communication between said passageway and said reservoir or close communication between said passageway and said reservoir and open said discharge nozzle or permit communication between said passageway and said reservoir and open said discharge nozzle.

7. In a grease gun head construction, a grease gun head having an intake for grease from a reservoir, a discharge nozzle, a booster pump between said intake and said discharge nozzle, a check valve located between said booster pump and said discharge nozzle and opening toward said discharge nozzle, said check valve being adapted to be opened by said booster pump in one of its positions, a passageway between the space intermediate said check valve and said discharge nozzle and said intake, a closure valve for said passageway and selectively operable means for holding said closure valve closed or open or constraining it to remain closed under resilient tension.

8. In a grease gun head construction, a grease gun head having an intake for grease from a reservoir, a discharge nozzle, a booster pump between said intake and said discharge nozzle, a check valve located between said booster pump and said discharge nozzle and opening toward said discharge nozzle, said booster pump, in one of its positions, engaging said check valve to open it, a passageway between the space intermediate said check valve and said discharge nozzle and communicating with said intake and a spring closed valve for said passageway opening toward said intake.

9. In a grease gun head construction, a grease gun head having a socketed boss, a grease reservoir snugly fitting therein and having an end contacting with the bottom of said socketed boss, said grease gun head having a sub-socket, a sleeve having one of its ends therein and having outwardly projecting lugs on its other end, and inwardly projecting lugs on said reservoir for coaction with the lugs of said sleeve, all of said lugs being annularly spaced whereby they may be rotated to registered connecting or non-registered disconnecting positions.

10. In a grease gun head construction, a grease gun head having an intake for grease from a reservoir, a discharge nozzle, a booster pump between said intake and said discharge nozzle, a check valve located between said booster pump and said discharge nozzle and opening toward said discharge nozzle, a passageway between the space intermediate said check valve and said discharge nozzle and said intake, a closure valve for said passageway and selectively operable means for holding said closure valve closed or open or constraining it to remain closed under resilient tension.

11. In a grease gun head construction, a grease gun head having an intake for grease from a reservoir, a discharge nozzle, a booster pump between said intake and said discharge nozzle, a check valve located between said booster pump and said discharge nozzle and opening toward said discharge nozzle, said booster pump in one of its positions engaging said check valve to open it, a passageway between the space intermediate said check valve and said discharge nozzle and communicating with said intake, a spring closed valve for said passageway opening toward said intake, and means to positively close said spring closed valve.

12. In a grease gun head construction, a grease gun head having an intake for grease from a reservoir, a discharge nozzle, a booster pump between said intake and said discharge nozzle, a check valve located between said booster pump and said discharge nozzle and opening toward said discharge nozzle, said booster pump, in one of its positions, engaging said check valve to open it, a passageway between the space intermediate said check valve and said discharge nozzle and communicating with said intake, a spring closed valve for said passageway opening toward said intake, and means to positively open said spring closed valve.

Des Moines, Iowa, September 23, 1932.

IVAN L. EASTMAN.